Nov. 6, 1951     S. J. KOPEC     2,574,110
ATTACHMENT FOR GRINDING MACHINES
Filed Aug. 17, 1946
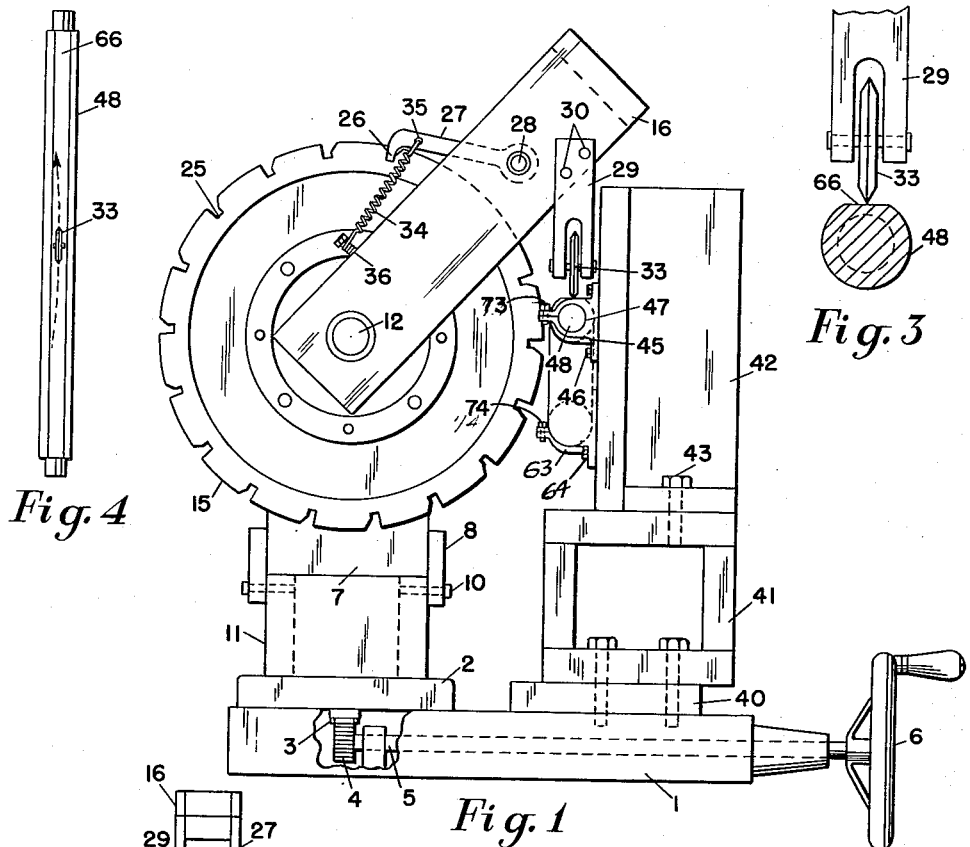
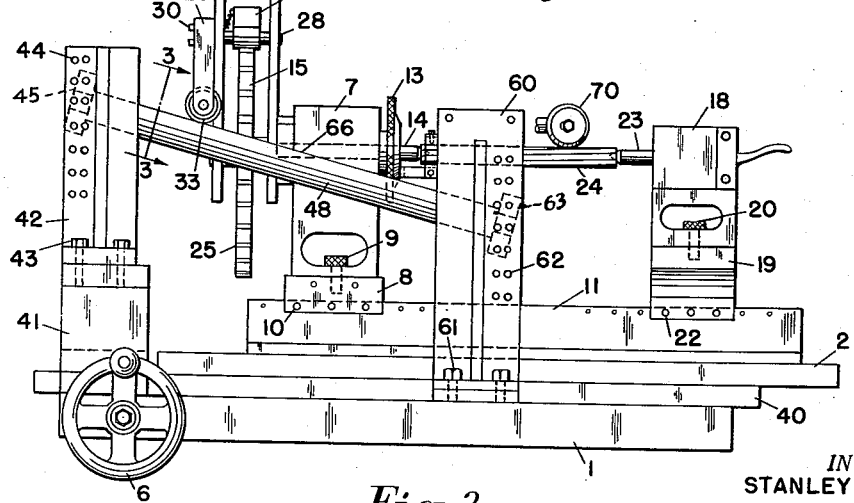
INVENTOR.
STANLEY J. KOPEC
BY
ATTORNEYS Patented Nov. 6, 1951

2,574,110

UNITED STATES PATENT OFFICE 2,574,110

ATTACHMENT FOR GRINDING MACHINES

Stanley J. Kopec, Detroit, Mich.

Application August 17, 1946, Serial No. 691,233

6 Claims. (Cl. 51—232)

This invention relates generally to grinding machines and more particularly to a novel attachment for a grinding machine for grinding helical teeth.

All devices of this character, made according to the teachings of the prior art, and with which I am familiar, have rotated the work while the bed moves relative to the grinding wheel when grinding a helical tooth but this method has not been successful with conventional methods because there was no adjustment to provide for variations in the width of the teeth when a gage with helical teeth such as a gage for helical grooves in a gun barrel was being ground. The helix (or spiral) of the teeth varied as much as five thousandths of an inch or more with conventional attachments. No means has heretofore been provided to adjust an attachment to permit grinding a helical tooth along its entire length within one ten-thousandths of an inch of error in the helix (or spiral). Irregularities and wear in gears, worms, and the like in prior machines have invariably produced irregular and inaccurate helical (or spiral) teeth.

It is, accordingly, an object of my invention to overcome the above and other defects in attachments for grinding helical teeth and it is more particularly an object of my invention to provide an attachment for a grinding machine for grinding helical teeth which is simple in construction, economical in cost, easy to set-up and operate, and economical in manufacture.

Another object of my invention is to provide an attachment for a grinding machine for helical teeth which may be adjusted to grind a helical tooth to an accuracy of one ten-thousandths of an inch or less as may be required by the job.

Other objects of my invention will become evident from the following detailed description, taken in conjunction with the accompanying drawings, in which Fig. 1 is an end elevational view of my novel attachment;

Fig. 2 is a side elevational view of my novel attachment;

Fig. 3 is a view taken on the line 3—3 of Fig. 2; and

Fig. 4 is a plan view of the guide bar showing the path of the guide wheel in dotted lines.

Referring now to the drawings, Figs. 1 and 2 show a base 1 with a movable bed 2 mounted thereon having a depending rack 3 for engagement with a gear 4 fixedly mounted on a transverse shaft 5 journalled in the base 1. A hand wheel 6 is disposed on the shaft 5 to move the bed 1 longitudinally. A headstock 7 is attached to a block 8 by screw bolts 9. The block 8 is attached to a base block 11 on the bed 2 by screw members 10. A shaft 12 is journalled in the headstock 7 and has a face plate 13, center 14, indexing wheel 15, and an angularly extending arm 16 mounted thereon. A tailstock 18 is attached to a block 19 by screw bolts 20. The block 19 is attached to the base block 11 on the bed 2 by screw members 22. A center 23 in alignment with the center 14 in the headstock 7 is disposed in the tailstock 18. The work 24 is held between the centers 14 and 23 in the headstock 7 and tailstock 18, respectively.

Graduated recesses 25 are cut around the periphery of the indexing wheel 15 to receive the end 26 of a pivoted arm 27 attached to a pin 28 carried by the arm 16. A vertically depending bracket 29, which is attached to the arm 16 by screw members 30, has a bifurcated end for receiving a hard surfaced wheel 33. A spring 34 attached in an aperture 35 in the pivoted arm 27 and to a screw member 36 on the arm 16 urges the end 26 of the indexing arm 27 into the recesses 25 on the indexing wheel 15.

A longitudinally extending plate 40 is disposed on the base 1 and has mounted thereon a supporting member 41. A vertically extending supporting member 42 is attached to the supporting member 41 by screw bolts 43 and has apertures 44 for attaching a supporting bracket 45 by screw bolts 46 with an aperture 47 for receiving one end of a guide bar 48. The guide bar 48 may be rotated by any suitable means. An upwardly extending support member 60 is attached to the plate 40 by screw bolts 61 and it has apertures 62 for attaching a bracket 63 by screw members 64 to receive the other end of the guide bar 48. The top of the guide bar 48 has a flattened surface 66, upon which the wheel 33 rides. It will be evident that the angle of the bar 48 may be varied both transversely and longitudinally. A guiding bar 48 may have either end thereof moved upwardly or downwardly by moving the brackets 45 and 63 respectively upwardly or downwardly on the supports 42 and 60 respectively. The apertures 44 and 62 in the supports 42 and 60 respectively receive the bolts 46 and 64 so that any variation or different sets of apertures may be used to receive the bolts 46 and 64 to move the brackets 45 and 63 upwardly or downwardly on the supports 42 and 60 respectively. When it is desired to rotate the guide member 48 to change its angularity rotationally or in a vertical plane, the brackets 45 and 63 are loosened by rotation of the nuts 73 and 74 on the outer end thereof.

In operation, a sample gage or the like with helical teeth is disposed between the centers 14 and 23 and a grinding wheel 70 with desired contour is set at the desired angle. The guide bar 48 is then set at the desired longitudinal and transverse angle and adjustment is made of the guide bar 48 until all parts of the helical tooth are in a position to be ground to a uniform thickness within less than one ten-thousandth of an inch or less when the bed 2 is moved longitudinally by the hand wheel 6. The wheel 33 moves in a curve on the flat surface 66 of the guide bar 48 which requires adjustment of the transverse angle of the guide bar 48 as well as the longitudinal angle. The movement of the wheel 33 over the angled guide bar 48 when the bed 2 is moved longitudinally causes rotation of the arm 16 and shaft 12 and the work 24 held in the centers 14 and 23. The index wheel 15 is rotated manually to rotate the work 24 a distance equal to the distance between the teeth. The machine is now ready for production operation.

It will be evident that my novel attachment permits adjustment so that the thickness of a helical tooth can be ground uniformly throughout its entire length to tolerances less than one ten-thousandth of an inch.

Various changes may be made in the specific embodiment of my invention without departing from the spirit thereof, or from the scope of the appended claims.

What I claim is:

1. An attachment for a machine having a movable reciprocating bed for grinding and inspecting helical gear teeth comprising a rotatable work holding member on said reciprocating bed, an indexing wheel attached to and rotatable with said work holding member, an arm extending outwardly from and pivoted on said rotatable work holding member, means for securing the indexing wheel in a predetermined position relative to said arm, a wheel supported on the outwardly extending end of said arm, a stationary guide bar spaced laterally of said bed and work holding member having a flat side over which said wheel runs to rotate said work holding member, adjustable support means for said guide bar for adjustably supporting said guide bar in different rotatable positions about its longitudinal axis and in different angular positions with respect to the line of travel of said bed and said work holding member in a horizontal plane, and means for moving said bed and work holding member relative to said guide bar and in parallel relationship thereto.

2. A machine for grinding and inspecting helical teeth comprising a base, a movable bed mounted on said base, a headstock and a tailstock mounted on said bed, a shaft journalled in said headstock, opposed centers on said shaft and said tailstock, means for securing a workpiece between said centers rotatable with said shaft, a laterally, outwardly extending arm pivoted on said shaft, means for selectively locking said arm and said shaft against relative rotation, a bracket on said arm, a wheel carried by said bracket, a stationary guide bar disposed on said base spaced laterally outwardly and parallel to said shaft and the path of the longitudinal movement of said headstock and tailstock having a flat side engaged by said wheel to rotate said arm, shaft, and said workpiece in unison upon a predetermined longitudinal movement of said workpiece, means for securing said guide bar in different rotative positions about its longitudinal axis, means for disposing the opposite ends of said guide bar in selected vertical positions with respect to said base, and means for moving said bed longitudinally.

3. A machine as set forth in claim 2 wherein said means for selectively locking said arm and said shaft against relative rotation comprises an indexing wheel with spaced notches around the circumference thereof and a finger pivoted on said arm engageable with said notches.

4. In a grinding machine, in combination, a base, a movable bed on said base, rotatable work holding means, supporting means mounted on said bed for said rotatable work holding means, a radially, outwardly extending arm pivoted on said rotatable work holding means, a bracket attached to said arm, a wheel carried by said bracket, means for selectively locking said rotatable work holding means and said arm against relative rotation, a stationary guide bar on said base disposed laterally of and parallel to the line of travel of said work holding means having a flat side engageable by said wheel on said arm to rotate said work holding means when in a locked position with said arm a predetermined amount when it is moved longitudinally relative to said guide bar a predetermined amount, adjustable support means for said guide bar whereby it may be rotatably adjusted about its longitudinal axis and either end thereof may be adjusted vertically to change the longitudinal angular position thereof with respect to said base, and means for moving said bed longitudinally in parallel relationship to said guide bar.

5. In a grinding machine as set forth in claim 4 wherein the means for selectively locking said work holding means and said arm against relative rotation comprises an index wheel with spaced grooves around the periphery thereof attached to and rotatable with said work holding means, and a finger carried by said arm engageable with said spaced peripheral grooves on said index wheel.

6. In a grinding machine as set forth in claim 4 wherein said adjustable support means for said guide bar comprises longitudinally spaced standards on said base, brackets attached to said standards for supporting opposite ends of said guide bar in predetermined rotative positions about its axis and in predetermined vertical positions with respect to said base, and means for securing said brackets to said standards in different vertical positions.

STANLEY J. KOPEC.

REFERENCES CITED

The following references are of record in the file of this patent:

UNITED STATES PATENTS

| Number | Name | Date |
|---|---|---|
| 1,147,214 | Cross | July 20, 1915 |
| 1,870,764 | Aeppli | Aug. 9, 1932 |
| 2,212,855 | Chittenden | Aug. 27, 1940 |
| 2,401,561 | Gruenberg | June 4, 1946 |

FOREIGN PATENTS

| Number | Country | Date |
|---|---|---|
| 395,737 | Germany | May 22, 1924 |
| 503,431 | Great Britain | Apr. 6, 1939 |
| 513,168 | Germany | Feb. 26, 1929 |